(12) United States Patent
Huang

(10) Patent No.: US 10,004,038 B2
(45) Date of Patent: Jun. 19, 2018

(54) METHOD OF BYPASSING DATA AND MOBILE DEVICE USING THE SAME

(71) Applicant: MEDIATEK INC., Hsin-Chu (TW)

(72) Inventor: Shun-Yong Huang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

(21) Appl. No.: 15/355,027

(22) Filed: Nov. 17, 2016

(65) Prior Publication Data

US 2017/0156114 A1 Jun. 1, 2017

Related U.S. Application Data

(60) Provisional application No. 62/261,337, filed on Dec. 1, 2015.

(51) Int. Cl.
*H04W 52/02* (2009.01)
*H04W 88/06* (2009.01)

(52) U.S. Cl.
CPC ... *H04W 52/0235* (2013.01); *H04W 52/0209* (2013.01); *H04W 88/06* (2013.01)

(58) Field of Classification Search
CPC ......... H04W 52/0235; H04W 52/0209; H04W 84/12; H04W 88/06; H04W 88/08; Y02B 60/50; H04L 67/28; H04L 69/14; H04L 67/2871; A61M 2205/3592; A61M 5/142; H04B 7/15592

See application file for complete search history.

(56) References Cited

U.S. PATENT DOCUMENTS

2012/0182894 A1* 7/2012 Gaines .................. A61B 5/0022
370/252
2014/0181172 A1* 6/2014 Elliott ................... H04W 28/08
709/201

* cited by examiner

*Primary Examiner* — James Yang
*Assistant Examiner* — Jianxun Yang
(74) *Attorney, Agent, or Firm* — Winston Hsu

(57) ABSTRACT

The present invention provides a method of bypassing data and a mobile device to establish a shared data path via a shared memory of the mobile device between network modules. The network modules may exchange data packets via the shared memory, and a processing unit of the mobile device enters into a sleep mode when the network modules exchange the data packets via the shared memory SM. The power consumption of the mobile device is therefore reduced.

15 Claims, 3 Drawing Sheets

METHOD OF BYPASSING DATA AND MOBILE DEVICE USING THE SAME

CROSS REFERENCE TO RELATED APPLICATIONS

This application claims the benefit of U.S. provisional application No. 62/261,337, filed on Dec. 1, 2015 and incorporated herein by reference.

The present invention relates to a method of bypassing data and a mobile device using the same, and more particularly, to a method and a mobile device capable of using a memory of the mobile device to exchange data between two network modules while a processor of the mobile device is in a sleep mode.

BACKGROUND

As the wireless communication technology evolves and the demand for wireless service increases, a mobile phone usually plays a role as a hotspot for a wireless local area network (WLAN), i.e., the mobile phone delivers data packets between a cellular network and the WLAN. Specifically, the mobile phone may include an application processor, a cellular modem and a Wi-Fi module. In a downlink direction, for example, the mobile phone may receive the data packets from a cellular base station via the cellular modem, and transmit the data packets towards device(s) within the WLAN via the Wi-Fi module. In addition, the application processor is mainly utilized for executing application programs (or software) of the mobile phone.

In the prior art, when the mobile functions as the hotspot, the application processor of the mobile phone needs to deliver the data packets between the cellular modem and the Wi-Fi module. In other words, even though the application processor temporarily has no application program to execute, the processor still has to keep awake just for delivering the data packets in between, which consumes a lot of unnecessary power.

Therefore, it is necessary to improve the prior art.

SUMMARY

It is therefore a primary objective of the present invention to provide a method of bypassing data and a mobile device using the same, to improve over disadvantages of the prior art.

An embodiment of the present invention discloses a method of bypassing data utilized in a mobile device. The mobile device comprises a processing unit, a first network module and a second network module. The method comprises reserving a shared memory among the first memory for the first network module and the second network module, wherein the shared memory is a part of a first memory of the mobile device; configuring the shared memory to be readable and writable by the first network module and the second network module; and the processing unit entering into a sleep mode when the first network module and the second network module exchange data packets via the shared memory.

An embodiment of the present invention further discloses a mobile device comprising a first network module; a second network module; a first memory, coupled to the first network module and the second network module; a processing unit; and a storage unit, configured to store a program code, the program code instructing the processing unit to perform reserving a shared memory among the first memory for the first network module and the second network module, wherein the shared memory is a part of a first memory of the mobile device; configuring the shared memory to be readable and writable by the first network module and the second network module; and entering into a sleep mode when the first network module and the second network module exchange data packets via the shared memory.

An embodiment of the present invention further discloses a method of a mobile device. The mobile device comprises a first network module and a second network module. The method comprises receiving a packet by the first network module; storing data within the packet in a shared memory; and accessing the data in the share memory by the second network module without activating a processing unit of the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
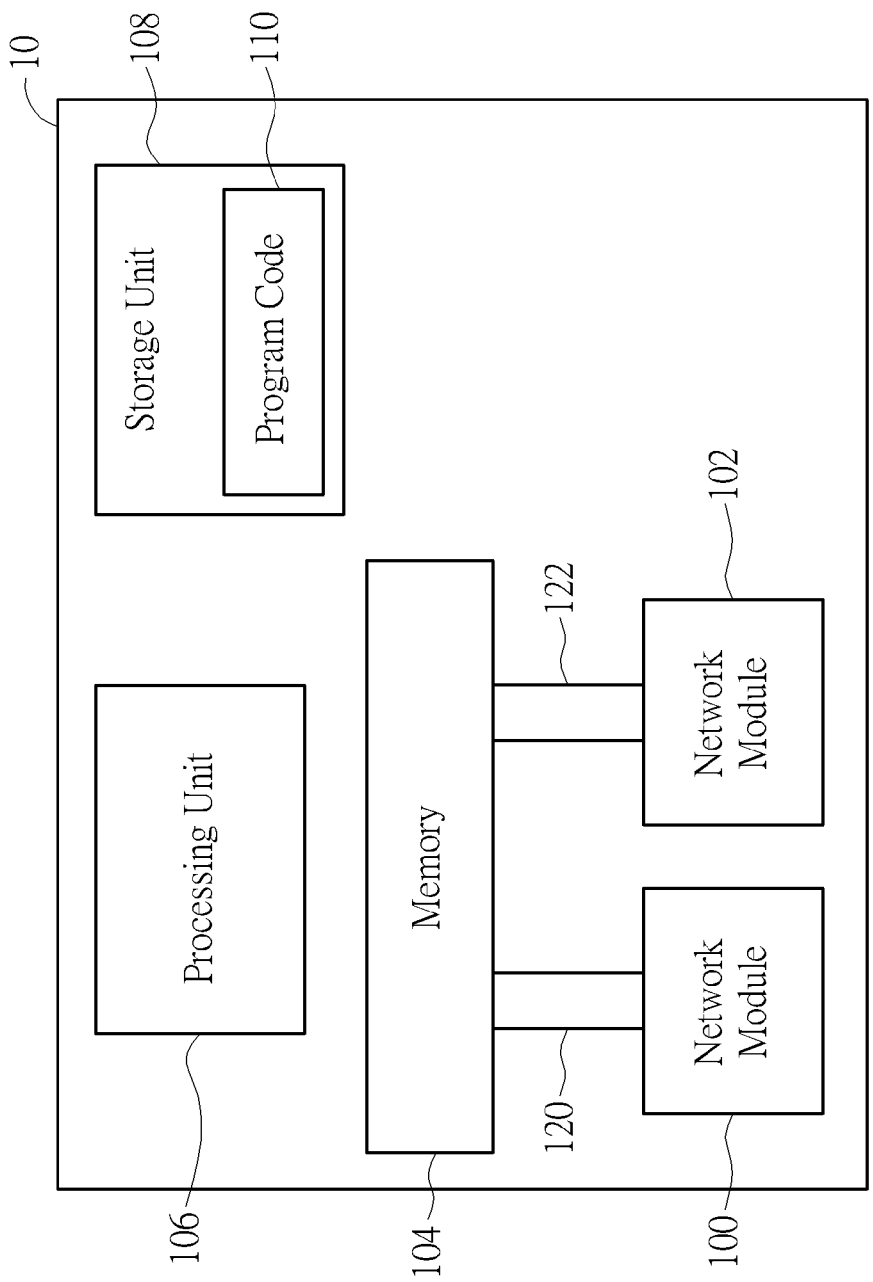
FIG. 1 is a schematic diagram of a mobile device according to an embodiment of the present invention.

Please refer to FIG. 1, which is a schematic diagram of a mobile device 10 according to an embodiment of the present invention. The mobile device 10 is a portable electronic device, such as a smart phone, a tablet computer, etc., which is able to function as a portable hotspot for a wireless local area network (WLAN). The mobile device 10 comprises a memory 104, a processing unit 106, a storage unit 108 and network modules 100, 102. The processing unit 106 may be a general purpose processing unit and utilized to execute application programs (or software) of the mobile device 10. For example, the processing unit 106 may be an application processor of the mobile device 10. The memory 104 may be a volatile memory, and preferably, the memory 104 may be a double data rate synchronous dynamic random access memory (DDR SDRAM). The memory 104 is coupled to the network modules 100, 102 via memory accessing logic circuits 120, 122, respectively. The network module 100 is configured to perform wireless communication with a base station which has backhaul connected. For example, the network module 100 may be a cellular modem performing wireless transmission with a cellular network (e.g., a long term evolution (LTE) network). The network module 100 may also generate voice packets when a voice related application is triggered. The network module 102 is configured to perform wireless communication with device(s) in the WLAN. The network module 102 may be a Wi-Fi module of the mobile device 10. The storage unit 108 is configured to store a program code 110, and the program code 110 is executed to instruct the processing unit 106 to execute a bypassing process to reduce power consumption of the mobile device 10. Moreover, according to another embodiment of the present invention, the network module 100 can be a Wi-Fi module while the network module 120 can be another Wi-Fi module. Therefore, the network module 100 is wirelessly connected to an access point while the network module is wirelessly connected to another wireless device, such as a television with Wi-Fi connection. Hence, the network module 100 and the network module 120 can follow the same or different communication standards.

The bypassing process may be initiated under a circumstance that the mobile device 10 functions as a hotspot and delivers data packets between the cellular network and the WLAN, and there is no other application program for the processing unit 106 to execute. In another circumstance that the voice packets generated by the network module 100 need to be transmitted via the WLAN and the voice packets do not need to be processed by the processing unit 106 (e.g., when the mobile device 10 makes a Wi-Fi call), the bypassing process may also be initiated. For the circumstances stated in the above, the processing unit 106 does not have to be awake for delivering the data packets between the network modules 100 and 102, and the processing unit 106 should enter into a sleep mode, which causes the processing unit 106 to consume more power.

To reduce power consumption of the mobile device 10, the processing unit 106 may establish a shared data path for the network modules 100, 102, such that the network modules 100, 102 may exchange the data packets via the shared data path. The shared data path is beyond/out of the processing unit 106, i.e., the shared data path is built to bypass the processing unit 106. Then, the processing unit 106 would enter into the sleep mode while the network modules 100, 102 exchange the data packets via the shared data path, so as to reduce power consumption.

Specifically, the processing unit 106 utilizes the memory 104 to establish the shared data path. In other words, the processing unit 106 may reserve a shared memory SM among the memory 104 as the shared data path for the network modules 100, 102, where the shared memory SM may be a part of the memory 104 of the mobile device. The processing unit 106 may further configure the shared memory SM to be readable and writable by the network modules 100, 102.

Figure 2:
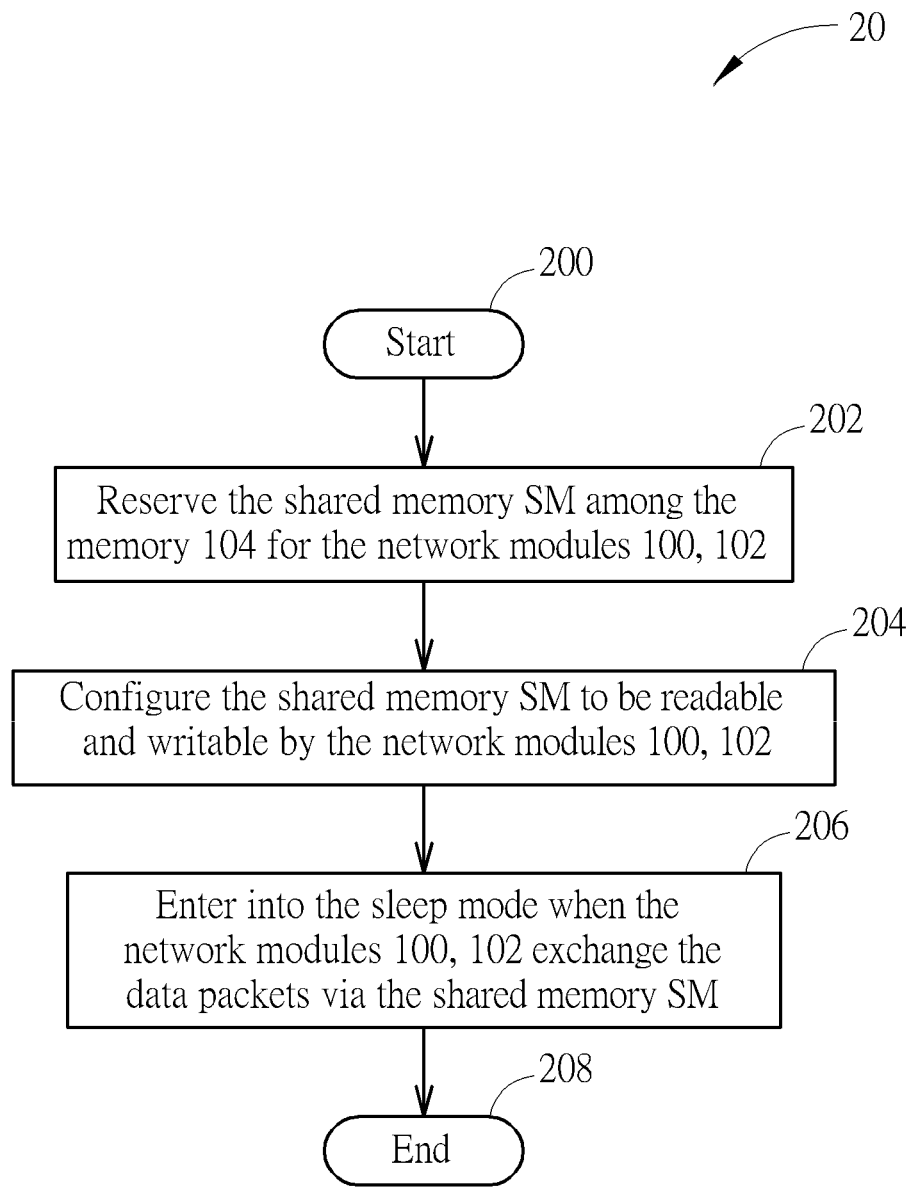
FIG. 2 is a schematic diagram of a bypassing process according to an embodiment of the present invention.

Operations of the processing unit 106 may be summarized as a bypassing process 20. Please refer to FIG. 2, which is a schematic diagram of the bypassing process 20 according to an embodiment of the present invention. The bypassing process 20 may be compiled as the program code 110 and executed by the processing unit 106. The bypassing process 20 comprises following steps:

Step 200: Start.

Step 202: Reserve the shared memory SM among the memory 104 for the network modules 100, 102.

Step 204: Configure the shared memory SM to be readable and writable by the network modules 100, 102.

Step 206: Enter into the sleep mode when the network modules 100, 102 exchange the data packets via the shared memory SM.

Step 208: End.

According to the bypassing process 20, the processing unit 106 utilizes the shared memory SM among the memory 104 as the shared data path for the network modules 100, 102 to exchange data packets. Details of the bypassing process 20 are described as follows. In Step 202, the processing unit 106 reserves the shared memory SM among the memory 104 for the network modules 100, 102. In detail, the processing unit 106 clears all the content stored in memory blocks corresponding to the shared memory SM within the memory 104. Preferably, the processing unit 106 may send commands to both the network modules 100, 102 and instruct the network modules 100, 102 not to access the shared memory SM. In other words, the processing unit 106 may prohibit the network modules 100, 102 from accessing the shared memory SM.

Figure 3:
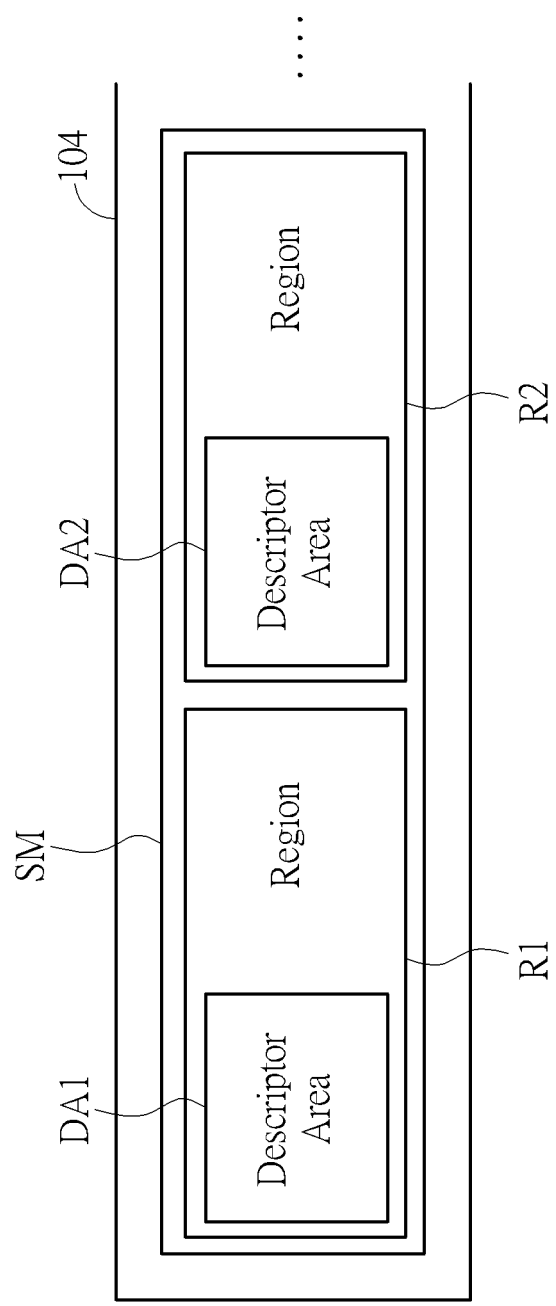
FIG. 3 is a schematic diagram of a shared memory according to an embodiment of the present invention.

In Step 204, the processing unit 106 configures the shared memory SM, such that the network modules 100, 102 are able to read and/or write the shared memory SM. Methods of the processing unit 106 configuring the shared memory SM are not limited. In an example, the processing unit 106 may partition the shared memory SM into a region R1 and a region R2, as shown in FIG. 3. The region R1 is for the network module 100 to write in and for the network module 102 to read from; the region R2 is for the network module 100 to read from and for the network module 102 to write in.

In addition, the processing unit 106 may assign a descriptor area DA1 and a descriptor area DA2 to the region R1 and the region R2, respectively. The descriptor area DA1 and the descriptor area DA2 include physical memory address information of each data packet. For example, when the network module 100 has data packets b1_1-b1_N to be written into the region R1 of the shared memory SM within the memory 104, the descriptor area DA1 would provide physical memory addresses a1_1-a1_N corresponding to the data packets b1_1-b1_N. Similarly, when the network module 102 has data packets b2_1-b2_N to be written into the region R2 of the shared memory SM within the memory 104, and the descriptor area DA2 would provide physical memory addresses a2_1-a2_N corresponding to the data packets b2_1-b2_N.

Therefore, when the mobile device 10 likes to deliver the data packets b1_1-b1_N from the network module 100 to the network module 102, the network module 100, with help of the descriptor area DA1 and the memory accessing logic circuit 120, would write the data packets b1_1-b1_N into the region R1 of the memory 104 according to the physical memory addresses a1_1-a1_N. The network module 102, with help of the descriptor area DA1 and the memory accessing logic circuit 122, would read the data packets b1_1-b1_N according to the physical memory addresses a1_1-a1_N from the region R1 of the memory 104. Similarly, when the mobile device 10 likes to deliver the data packets b2_1-b2_N from the network module 102 to the network module 100, the network module 102, with help of the descriptor area DA2 and the memory accessing logic circuit 122, would write the data packets b2_1-b2_N into the region R2 of the memory 104 according to the physical memory addresses a2_1-a2_N. The network module 100, with help of the descriptor area DA2 and the memory accessing logic circuit 120, would read the data packets b2_1-b2_N according to the physical memory addresses a2_1-a2_N from the region R2 of the memory 104.

Preferably, the data packets b1_1-b1_N and the data packets b2_1-b2_N can be written and read in a first-in-first-out (FIFO) fashion. To achieve that, in an example, the processing unit 106 may employ data structure as two ring structures for the descriptor areas DA1, DA2, where one ring structure is an empty ring and the other structure is an in-used ring. Take the data packets b1_1-b1_N and the physical memory addresses a1_1-a1_N as an example, when the network module 100 writes one data packet of the data packets b1_1-b1_N, the network module 100 would take one entry from the beginning of the empty ring, and place the entry to the end of the in-used ring. When the network module 102 reads one data packet of the data packets b1_1-b1_N, the network module 102 would take one entry from the beginning of the in-used ring, and place the entry to the end of the empty ring. The entry stated in the above may be referred to one of the physical memory addresses a1_1-a1_N. Due to the ring structures, the data packets b1_1-b1_N and the data packets b2_1-b2_N would be written and read sequentially and in the FIFO fashion.

Hence, after the processing unit 106 executes Step 204, i.e., the descriptor areas DA1, DA2 are assigned and the memory 104 is configured, when the mobile device 10 likes to deliver the data packets b1_1-b1_N from the network module 100 to the network module 102, the network module 100 is able to write the data packets b1_1-b1_N into the physical memory addresses a1_1-a1_N sequentially in the region R1 of the shared memory SM within the memory 104, and the network module 102 is able to read the data packets b1_1-b1_N from the physical memory addresses a1_1-a1_N sequentially from the region R1 of the shared memory SM within the memory 104. Similarly, when the mobile device 10 likes to deliver the data packets b2_1-b2_N from the network module 102 to the network module 100, the network module 102 is able to write the data packets b2_1-b2_N into the physical memory addresses a2_1-a2_N sequentially in the region R2 of the shared memory SM within the memory 104, and the network module 100 is able to read the data packets b2_1-b2_N from the physical memory addresses a2_1-a2_N sequentially from the region R2 of the shared memory SM within the memory 104. In other words, the network modules 100, 102 actually exchange the data packets b1_1-b1_N or the data packets b2_1-b2_N via the shared memory SM. Then, the processing unit 106 may send commands to both the network modules 100, 102, to inform the network modules 100, 102 that the shared memory SM is ready to be written and/or read. In other words, the processing unit 106 may allow the network modules 100, 102 to access the shared memory SW after the shared memory SM is configured to be readable and writable by the network modules 100, 102.

In addition, when the network modules 100, 102 exchange the data packets b1_1-b1_N or the data packets b2_1-b2_N via the shared memory SM, in Step 206, the processing unit 106 enters into the sleep mode. In the sleep mode, the processing unit 106 consumes rare electric power, so as to save power consumption when the mobile device 10 functions as the hotspot. Notably, the rest of the memory 104, besides the shared memory SM, may enter into the sleep mode as well. To achieve that, the processing unit 106 may send a sleeping command to the memory 104, such that the rest of the memory 104 (besides the shared memory SM) would also enter into the sleep mode, so as to save more power when the mobile device 10 functions as the hotspot (or the mobile device 10 makes a Wi-Fi call). Details of the processing unit 106 and/or the memory 104 entering into the sleep mode are known by one skilled in the art, which is not narrated herein for brevity.

In addition, there are some data packets in a specific traffic pattern, delivered between the network modules 100, 102, needed to be processed by the processing unit 106. To prevent those data packets from being omitted by the processing unit 106, before the processing unit 106 enters into the sleep mode, the processing unit 106 may send a traffic information to the network module 100 or the network module 102. The traffic information specifies the specific traffic pattern in which data packets need to be processed by the processing unit 106. While the processing unit 106 is in the sleep mode, the network module 100 or the network module 102 may send an awaking message to the processing unit 106 when the network module 100 or the network module 102 detects data packets which belong to the specific traffic pattern, to awake the processing unit 106 to process those data packets in the specific traffic pattern.

According to another embodiment of the present invention, the mobile device 10 can transmits data in a more power-conservative way. When the network module 100 receives a packet from the network it connected, the data within the packet can be stored into the memory 104. The network module 102 can then access the data stored in the memory 104 without activating or waking up the processing unit 106. Therefore, the power consumed by the mobile device 10 can therefore be reduced.

In the prior art, when the mobile phone functions as the hotspot, the application processor of the mobile phone has to keep awake to deliver the data packets between the cellular modem and the Wi-Fi module, which consumes a lot of unnecessary power. In comparison, according to the bypassing process 20, the processing unit 106 establishes the shared data path via the shared memory SM within the memory 104, such that the network modules 100, 102 may exchange the data packets via the shared memory SM, and the processing unit 106 may enter into the sleep mode when the network modules 100, 102 exchange the data packets via the shared memory SM, so as to reduce the power consumption of the mobile device 10.

Notably, the embodiments stated in the above are utilized for illustrating the concept of the present invention. Those skilled in the art may make modifications and alternations accordingly, and not limited herein. For example, the network modules 100, 102 may comprise microprocessors or be realized by application specific integrated circuit (ASIC). The storage unit 108 may be read-only memory (ROM), random-access memory (RAM), non-volatile memory (e.g., an electrically erasable programmable read only memory (EEPROM) or a flash memory), CD-ROMs, magnetic tapes, floppy disks, optical data storage devices, etc., and not limited herein.

In summary, the present invention establishes the shared data path between the network modules via the shared memory, such that the network modules may exchange the data packets via the shared memory, and the processing unit of the mobile device may enter into the sleep mode when the network modules exchange the data packets via the shared memory. Thus, the power consumption of the mobile device is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of bypassing data, utilized in a mobile device, the mobile device comprising a processing unit, a first network module and a second network module, the method comprising:
    reserving a shared memory among a first memory for the first network module and the second network module, wherein the shared memory is a part of the first memory of the mobile device;
    configuring the shared memory to be readable and writable by the first network module and the second network module; and
    the processing unit entering into a sleep mode when the first network module and the second network module exchange data packets via the shared memory;

wherein configuring the shared memory to be readable and writable by the first network module and the second network module comprises:

partitioning the shared memory into a first region and a second region, wherein the first region is for the first network module to write and for the second network module to read, and the second region is for the first network module to read and for the second network module to write; and assigning a first descriptor area and a second descriptor area to the first region and the second region of the shared memory respectively, wherein the first descriptor area and the second descriptor comprise physical memory address information corresponding to the data packets to be written or read by either the first network module or the second network module.

2. The method of claim 1, wherein reserving the shared memory among the first memory comprises:

clearing memory blocks of the first memory corresponding to the shared memory.

3. The method of claim 1, wherein reserving the shared memory among the first memory further comprises:

prohibiting both the first network module and the second network module from accessing the shared memory.

4. The method of claim 1, further comprising:

allowing both the first network module and the second network module to access the shared memory after configuring the shared memory to be readable and writable by the first network module and the second network module.

5. The method of claim 1, further comprising:

checking whether the data packets belong to a specific traffic pattern; and the first network module and the second network module sending an awaking message to the processing unit when the data packets belong to the specific traffic pattern.

6. The method of claim 1, wherein the processing unit entering into the sleep mode further comprises:

sending a sleeping command to the first memory such that the rest of the first memory, besides the share memory, enters into the sleep mode when the first network module and the second network module exchange data packets via the shared memory.

7. A mobile device, comprising:

a first network module;

a second network module;

a first memory, coupled to the first network module and the second network module;

a processing unit; and a non-transitory storage unit, configured to store a program code, the program code instructing the processing unit to perform following steps:

reserving a shared memory among the first memory for the first network module and the second network module, wherein the shared memory is a part of the first memory of the mobile device;

configuring the shared memory to be readable and writable by the first network module and the second network module; and entering into a sleep mode when the first network module and the second network module exchange data packets via the shared memory;

wherein the program code further instructs the processing unit to perform the following steps, for configuring the shared memory to be readable and writable by the first network module and the second network module:

partitioning the shared memory into a first region and a second region, wherein the first region is for the first network module to write and for the second network module to read, and the second region is for the first network module to read and for the second network module to write; and assigning a first descriptor area and a second descriptor area to the first region and the second region of the shared memory respectively, wherein the first descriptor area and the second descriptor comprise physical memory address information corresponding to the data packets to be written or read by either the first network module or the second network module.

8. The mobile device of claim 7, wherein the program code further instructs the processing unit to perform the following step, for reserving the shared memory among the first memory:

clearing memory blocks of the first memory corresponding to the shared memory.

9. The mobile device of claim 7, wherein the program code further instructs the processing unit to perform the following step, for reserving the shared memory among the first memory:

prohibiting both the first network module and the second network module from accessing the shared memory.

10. The mobile device of claim 7, wherein the program code further instructs the processing unit to perform the following step:

allowing both the first network module and the second network module to access the shared memory after configuring the shared memory to be readable and writable by the first network module and the second network module.

11. The mobile device of claim 7, wherein the first network module or the second network module is further configured to perform the following steps:

checking whether the data packets belong to a specific traffic pattern; and sending an awaking message to the processing unit when the data packets belong to the specific traffic pattern.

12. The mobile device of claim 7, wherein the program code further instructs the processing unit to perform the following step:

sending a sleeping command to the first memory such that the rest of the first memory, besides the share memory, enters into the sleep mode when the first network module and the second network module exchange data packets via the shared memory.

13. The mobile device of claim 7, wherein the first network module is configured to perform wireless communication with a base station having a backhaul connection.

14. The mobile device of claim 7, wherein the second network module is configured to perform wireless communication with a device in a wireless local area network (WLAN).

15. The mobile device of claim 7, wherein the first memory is a volatile memory.

\* \* \* \* \*